United States Patent
Hall et al.

(10) Patent No.: US 9,176,256 B2
(45) Date of Patent: Nov. 3, 2015

(54) PLASTIC AUTOMOTIVE MIRRORS

(75) Inventors: Colin James Hall, Brighton (AU);
Simon David Field, Flagstaff Hill (AU);
Kamil Zuber, Parafield Gardens (AU)

(73) Assignees: University of South Australia (AU);
SMR Patents S.a.r.l. Le Dome,
Luxembourg (LU)

( * ) Notice: Subject to any disclaimer, the term of this patent is extended or adjusted under 35 U.S.C. 154(b) by 579 days.

(21) Appl. No.: 13/515,161

(22) PCT Filed: Dec. 24, 2010

(86) PCT No.: PCT/AU2010/001749
§ 371 (c)(1),
(2), (4) Date: Feb. 21, 2013

(87) PCT Pub. No.: WO2011/075796
PCT Pub. Date: Jun. 30, 2011

(65) Prior Publication Data
US 2013/0194687 A1     Aug. 1, 2013

(30) Foreign Application Priority Data

Dec. 24, 2009 (AU) ................ 2009906281
Oct. 22, 2010 (AU) ................ 2010904732

(51) Int. Cl.
*G02B 5/26* (2006.01)
*G02B 1/04* (2006.01)
*G02B 5/08* (2006.01)

(52) U.S. Cl.
CPC ............. *G02B 1/04* (2013.01); *G02B 5/0808* (2013.01)

(58) Field of Classification Search
CPC ...... G02B 5/08; G02B 5/0808; G02B 5/0816; G02B 5/0841; G02B 5/085; G02B 5/0858; G02B 5/0866; G02B 5/0875
USPC ................................... 359/883, 884
See application file for complete search history.

(56) References Cited

U.S. PATENT DOCUMENTS

| | | | |
|---|---|---|---|
| 6,420,032 B1 | 7/2002 | Iacovangelo | |
| 2002/0196628 A1 | 12/2002 | Yoshida et al. | |
| 2009/0258221 A1* | 10/2009 | Diehl et al. | 428/332 |

FOREIGN PATENT DOCUMENTS

| | | |
|---|---|---|
| JP | 61235801 A | 10/1986 |
| JP | 61235802 A | 10/1986 |
| JP | 2005234188 | 9/2005 |
| KR | 20010085132 A | 9/2001 |

OTHER PUBLICATIONS

International Search Report PCT/AU2010/001749 dated Feb. 15, 2011.

* cited by examiner

*Primary Examiner* — Euncha Cherry
(74) *Attorney, Agent, or Firm* — Lerner, David, Littenberg, Krumholz & Mentlik, LLP0

(57) ABSTRACT

A plastic mirror that includes a plastic substrate having a front surface, a hardcoating on the front surface, a reflective layer, and an intermediate zone between the hardcoating and the reflective layer, the intermediate zone including at least one layer formed from a material selected from the group consisting of metals and metalloids, oxides and nitrides of metals and metalloids, and carbon.

61 Claims, 1 Drawing Sheet

PLASTIC AUTOMOTIVE MIRRORS

CROSS-REFERENCE TO RELATED APPLICATIONS

The present application is a national phase entry under 35 U.S.C. §371 of International Application No. PCT/AU/2010/001749 filed Dec. 24, 2010, published in English, which claims priority from Australian Patent Application No. 2009906281, filed Dec. 24, 2009, and Australian Patent Application No. 2010904732, filed Oct. 22, 2010, all of which are incorporated herein by reference.

FIELD OF THE INVENTION

The present invention relates to a mirror formed on a plastic substrate, the mirror being for use primarily in automotive applications.

BACKGROUND OF THE INVENTION

Conventional glass mirrors for automotive use are heavy (especially with the trend towards larger mirrors), tend to be difficult to form aspheric or complex shapes, and are prone to shatter in the case of accidents. The replacement of glass with a plastic substrate would offer the ability to mould complex shapes, to integrate retention/clipping features on the rear, to reduce weight, and to achieve a high level of impact resistance. However, plastic substrates tend to be soft, would be readily damaged by UV radiation, heat and water, and would have a propensity towards causing the reflective surface to craze.

In addition to the softness problems that would expect to be introduced by the use of a plastic substrate for mirrors, some reflective layers typically used for mirrors (of any type) that are formed from direct metal deposition (such as of aluminium or silver) also themselves tend to be soft. To minimise this problem with glass substrates, most reflective layers are conventionally applied to the rear surface. However, for reflective metals such as chromium, which are harder and more resistant to the elements by virtue of their chemical and mechanical properties, these metals are predominantly applied to the front surface of glass substrates.

However, if this were attempted with a plastic substrate, it would be expected that the reflective coating would exhibit crazing, which would be made worse in durability testing such as thermal cycling, and which would likely also fail other standard tests such as a salt spray test (being either DIN 50 021 or ASTM B117).

In the case of plastic mirrors, the reflective layer could be applied to the rear or front surface and a hard coating applied in order to provide environmental exposure protection of the plastic substrate and the reflective coating, whilst providing improved abrasion resistance. However, for an automotive application, a rear surface plastic mirror has not been regarded as suitable as it would be interrupted by any retention/clipping features on the rear of the mirror. Also, in the case of an applied hardcoating, interference bands would be present which are cosmetically unacceptable.

It would thus be desirable to manufacture a plastic mirror, suitable for automotive applications, which does not craze, which does not have interference fringes and which passes the normal automotive tests such as a salt spray test, thermal cycling and shock tests, and accelerated weathering tests.

The above discussion of background is included to explain the context of the present invention. It is not to be taken as an admission that any of the material referred to was published, known or part of the common general knowledge at the priority date of any one of the claims. Also, before turning to a general description of the invention, and for the sake of clarity, it should be appreciated that references throughout the specification to the "front" of a mirror are references to the side of the mirror upon which reflected images are ordinarily viewed by a user.

SUMMARY OF THE INVENTION

The present invention provides a plastic mirror that includes a plastic substrate having a front surface, a hardcoating on the front surface, a reflective layer, and an intermediate zone between the hardcoating and the reflective layer, the intermediate zone including at least one layer formed from a material selected from the group consisting of metals and metalloids, oxides and nitrides of metals and metalloids, and carbon.

The present inventors have found that by locating a reflective layer at the front of a plastic substrate, with a suitable hardcoating therebetween, the hardcoating ensures good adhesion and provides abrasion resistance, such that a desirable reflective plastic mirror can be produced, having no interference fringes.

Furthermore, reflective layers for automotive use need to have low transparency (less than about 4% transparency), which would ordinarily require the adoption of relatively thick reflective layers in the order of 20 to 50 nm. However, the present inventors have determined that such thick reflective layers are more prone to stress crazing/cracking when deposited directly onto hardcoatings due to high tensile film stresses and a mismatch in thermal expansion coefficients.

The present inventors have thus further found that the use of the intermediate zone between the hardcoating and the reflective layer permits the adoption of the type of abrasion resistant hardcoating materials that are desirable and preferable for use with a plastic substrate, permits the adoption of materials that would be desirable for use as the reflective layer, and also avoids the crazing problem, thus overcoming the problems that have previously existed in attempts at producing plastic mirrors for automotive use.

By way of explanation, and while not wanting to be bound by this theory, the present inventors have noted that various aspects of the stress of combined layers in a coating system must be considered and balanced to achieve a durable coating system.

In particular, a highly stressed interface between layers needs to be avoided so as to prevent a high region of stress becoming a locus for failure. For example, a compressive layer pulls in one direction against a tensile layer pulling in the opposite direction, generating a high interfacial stress. This high interfacial stress can lead to failure at the interface, and it has been found that by controlling this interfacial stress (reducing it) failure can be avoided. However, combined layers with little or no residual stress have also been found by the present inventors to perform badly.

It is thus believed that some residual compressive stress is preferred in order to maintain the integrity of the combined layers. Indeed, the present inventors have additionally noted a similar principle in relation to abrasion resistance, where it is apparent that a stressed layer shows (at certain stress levels) an improved abrasion resistance to that of an un-stressed layer.

The present inventors have thus found that it is preferred to control internal stress parameters of a plastic mirror such that the differential stress is minimised. The present inventors have also found that it is further preferred to control internal stress parameters of a plastic mirror such that the residual stress is compressive.

In terms of being able to control internal stress parameters, ideally the stress of the entire coating system will be controlled, in both magnitude and mode. In this respect, and throughout this specification, the term "differential stress" is to be taken as meaning the difference in stress between the intermediate zone and the reflective layer, which is representative of the interfacial strain experienced at the interface between the intermediate zone and the reflective layer. The term "residual stress" is to be taken as meaning the combined stress of the intermediate zone and the reflective layer, which might thus be regarded as the resultant or absolute stress.

Most reflective layers are tensile at room temperature, which, when applied to plastic substrates, craze when exposed to elevated temperatures such as 85° C. (an auto industry standard). It appears that this is due to the difference in coefficient of thermal expansion (CTE) between reflective layers ($7 \times 10^{-6}$ mm/mm/° C. to $20 \times 10^{-6}$ mm/mm/° C.) and plastic substrates ($40 \times 10^{-6}$ mm/mm/° C. to $70 \times 10^{-6}$ mm/mm/° C.), where the plastic substrate expands significantly more than the reflective layer when heated. By applying a compressive layer in the intermediate zone with stress of a greater magnitude between the reflective layer and the hardcoating, a reduction in tensile stress is achieved and this has been found to prevent crazing occurring during exposure to the abovementioned temperatures and thermal shocks.

In a preferred form, it has been found that the differential stress in the mirror will be suitably minimised when it is between about 730 MPa and about 930 MPa, or more preferably when it is about 830 MPa. In a further preferred form, it has been found that the residual stress is ideally between about −350 MPa and about −600 MPa, at least insofar as the "measured" stress is concerned, or more preferably is about −400 MPa (the designation of the residual stress as being negative is of course a reference to residual stress being compressive).

When manufacturing a plastic mirror according to the present invention, the "measured residual stress" within the coating system (that is the combined stress of the intermediate zone and reflective layer) is preferably controlled such that it falls within the abovementioned range. It has been recognised by the inventors that compressive coating systems perform well in durability tests in which there is significant thermal variation. Indeed, it has been recognised that a compressively stressed coating system is able to expand with an expanding substrate under temperature increases without crazing or cracking, and that on cooling it can return to an intact state as no permanent deformation will have occurred. However, a coating system in tensile stress (or at very low compressive stress), when heated beyond some critical point, tends to craze or crack due to the tensile stress (which is pulling the coating apart) overcoming the integrity of the coating system. In this situation, permanent deformation occurs and on cooling cracking and crazing can be observed.

It has also been recognised by the inventors that a compressively stressed coating system, being a system having layers with dense, closely packed structures, performs well in salt spray testing. It is believed that such structures are less susceptible to ingress of the salt solution. For coating systems which have low compressive stress or are in tensile stress, and so have layers with loosely packed structures, this ingress leads to damage of the intermediate zone and delamination during salt spray.

However, to manufacture a plastic mirror in a manner that permits control of the measured residual stress within the coating system, the inventors have determined that is helpful for the stress ranges of the individual layers to be known, so that when they are combined into a coating system they result in the desired measured residual stress.

In a preferred form, it has been determined that the intermediate zone preferably has a stress range between about −380 MPa and about −480 MPa and more preferably a stress of about −430 MPa, while the reflective layer preferably has a stress range between about 350 MPa and about 450 MPa and more preferably a stress of about 400 MPa.

In relation to the distinction between "measured" stress values and "calculated" stress values, it will be appreciated that both differential stress and residual stress can be calculated for any given coating system. Diagrams A and B below illustrate how the values for "differential stress" and "residual stress" are determined. Where differential stress is the absolute difference between the two layers (see Diagram A), it acts at the interface of the two layers; it has been seen that a high differential stress can lead to poor adhesion, due to failure at this interface. The calculated residual stress (see Diagram B) is the sum of the two layers and can be thought of as the resultant stress, taking into account the balance between any compressive and tensile stresses.

Diagram A

Diagram B

Interestingly, the present inventors have observed that the measured residual stress of the coating system and the calculated residual stress of the individual layers differ markedly. For example, by calculation a preferred embodiment would give a calculated residual stress of −30 MPa. However, the measured residual stress has been found to be −400 MPa. This difference has been attributed to the effect that sequential deposition has on any preceding layers, and will be explained further in the following pages.

It is believed that the deposition of the reflective layer, whilst the subsequent intermediate zone and substrate are still warm, acts to decrease the tensile nature of the reflective layer, giving rise to the difference. Indeed, while it might be expected that it is advantageous to deposit layers individually (based on individually calculated stress levels) so that the correct intermediate zone stress and the correct reflective layer stress can be obtained, it has however been found that this is not advantageous for a manufacturing process. Indeed, the preferred method of manufacture is to sequentially deposit the individual layers so as to realise the end product in as short a time as possible.

Thus the preferred optimization is for a sequentially deposited coating system which has a measured residual stress which falls within the range mentioned above of between about −350 MPa and about −600 MPa.

The present inventors have thus found that the optimum value for stress depends on the method of manufacture (sequential versus individual layers). A coating system deposited sequentially will have a much higher measured residual stress than a coating system that is made from layers deposited individually. However, the inventors have recognised that good performance in durability testing will be obtained if the stress falls within the desired ranges (for both individually and sequentially deposited systems). To realise a practical production process it thus should be understood that the individual layer stresses must be first determined and then a sequential deposition used to determine the measured residual stress. Final optimisation is then able to occur on the sequentially deposited coating system.

From the above description it will be understood that stress is an important parameter when considering the present invention. Stress is calculated by measuring the deflection of a substrate of known mechanical properties (usually a silicon wafer, although plastic wafers can be used) after the deposition of the coating. Through Stoney's equation this deflection is converted to stress.

$$\sigma_{film} \approx -\frac{E_s}{1-v_s} \frac{h_s^2}{6h_f} \frac{1}{R} \quad \text{Equation (1)}$$

where $E_s$ $h_s$ and $v_s$ are the modulus, thickness and Poisson's ratio of the substrate, $h_f$ the thickness of the film and R the bend radius.

A wafer (silicon of 50 to 100 mm in diameter) is first measured to establish its initial radius of curvature by a laser range finder with micron resolution across 4 axes, which is then averaged to create a baseline measurement. The wafer is then coated with the film whose stress is to be measured. After deposition the wafer is again measured for curvature across 4 axes and the radius calculated. The difference in curvature between the baseline and the measured value represents the deflection caused by the stress within the film and is used in equation (1) to calculate stress.

The stress in a thin film is the sum of thermal, intrinsic and external stress (see Equation (2)):

$$\sigma_{film} = \sigma_{thermal} + \sigma_{intrinsic} + \sigma_{external} \quad \text{Equation (2)}$$

The external stress ($\sigma_{external}$) includes all interaction with the environment (mechanical, chemical or physical). The intrinsic stress ($\sigma_{intrinsic}$) is related to defects in the film, and is dependent on the deposition conditions.

The thermal stress (see Equation (3)) is dependent on the difference between the thermal expansion coefficients of the substrate and the film ($\alpha_f - \alpha_s$), the difference between the deposition temperature and room temperature ($\Delta T$) and the mechanical properties of the film material $E_f/(1-v_f)$:

$$\sigma_{thermal} = (\alpha_f - \alpha_s)\Delta T E_f/(1-v_f) \quad \text{Equation (3)}$$

The thermal stress can be calculated assuming that ($\alpha_f - \alpha_s$), $E_f/(1-v_f)$ are known and $\Delta T$ measured during deposition. For silicon wafers there is only a small thermal stress component. Through measurements on polycarbonate wafers, the large influence thermal events have on system stress can be measured. Any one or all of these stresses may be modified to achieve a desired level of stress.

During manufacture of a plastic mirror in accordance with the present invention, it has been found that the stress can additionally be controlled through some of the deposition parameters of the individual layers and the temperature profile of the part during coating. More particularly, the stress levels of the intermediate zone, the reflective layer and a cap layer (where present) may be controlled by varying sputter power, pressure, temperature, deposition rate, substrate bias and target to substrate distance.

A preferred method of reducing stress in the intermediate zone is thus by reducing the sputter power. A preferred method of reducing the stress in the reflective layer is by adding a small percentage (5%) of nitrogen into the feed gas during sputtering. Addition of nitrogen may have the added benefit of increasing the hardness and subsequently the abrasion resistance of the mirror.

Through legislation it is a requirement for an exterior automotive mirror to have reflectivity above 35%. However, the requirements of most automotive manufacturers is for there to be a minimum reflectivity of 50%, measured using illuminant A and observer angle 2°, via standard SAE J964. In addition, the colour of the mirror should have a C*<16 (where C*=√((a*)²+(b*)² using the CIEL*a*b* colour scale). Variations in coating parameters or the addition of extra layers can reduce the reflection or cause unwanted residual colour. The mirror according to the invention is ideally designed and manufactured with these criteria in mind.

The present invention thus additionally provides a plastic mirror that includes a plastic substrate having a front surface, a hardcoating on the front surface, a reflective layer, and an intermediate zone between the hardcoating and the reflective layer, the intermediate zone including at least one layer formed from a material selected from the group consisting of metals and metalloids, oxides and nitrides of metals and metalloids, and carbon, wherein the mirror has a residual stress that is compressive.

The present invention also provides a plastic mirror that includes a plastic substrate having a front surface, a hardcoating on the front surface, a reflective layer, and an intermediate zone between the hardcoating and the reflective layer, the intermediate zone including at least one layer formed from a material selected from the group consisting of metals and metalloids, oxides and nitrides of metals and metalloids, and carbon, wherein the mirror has a measured residual stress between about −350 MPa and about −600 MPa. In a preferred form, the mirror has a differential stress between about 730 and about 930 MPa.

The plastic substrate of the mirror of the present invention may be formed from any suitable polymeric or plastic material. For example, the plastic substrate may be formed from a material selected from the group including polyacrylate, polyester, polystyrene, polyethylene, polypropylene, polyamides, polyimides, polycarbonate, epoxy, phenolic, acrylonitrile-butadiene-styrene, acrylonitrile-styrene-arylates, acetal and blends of these. Preferred substrate materials include polycarbonate, poly (2,2'-dihydroxyphenylpropane) carbonate, polydiethyleneglycol bis(allyl carbonate), polymethylmethacrylate and polystyrene, or blends thereof.

Preferably, the plastic substrate is formed by injection compression moulding, although any other method known in the art such as compression moulding, blow moulding, reaction moulding and sheet casting, could also be utilised and thus also falls within the scope of the present invention.

The plastic mirror of the present invention makes use of a coating referred to as a "hardcoating" (which ideally provides both "abrasion resistance" and "chemical resistance"), and a layer referred to as a "reflective" layer. These terms require some explanation.

A coating that is said to be a "hardcoating" is a coating that is harder and stiffer than the substrate whereby it increases the abrasion resistance of that substrate. An abrasion resistant coating is one that reduces damage due to impacts and scratching. Abrasion resistance can be measured through tests such as ASTM F735 "Standard Test Method for Abrasion Resistance of Transparent Plastics and Coatings Using the Oscillating Sand Method", ASTM D4060 "Standard Test Method for Abrasion Resistance of Organic Coatings", by the Taber Abrader and by using the well known Steelwool Test.

Furthermore, some plastic substrates can be damaged by certain solvents, for example polycarbonate is damaged by acetone. It is a requirement in the automotive industry for the mirror to be "chemically resistant", which is a reference to an ability to withstand exposure to normal solvents such as diesel fuel, petroleum, battery acid, brake fluid, antifreeze, acetone, alcohol, automatic transmission fluid, hydraulic oil and ammonia based window cleaners. In this respect, it will be appreciated that the hardcoating ideally provides the mirror of the present invention with such chemical resistance.

The hardcoating of the plastic mirror of the present invention is preferably formed from one or more abrasion resistant layers, and may include a primer layer that bonds well to the plastic substrate and forms a preferable material for subsequent abrasion resistant layers. The primer layer may be provided by any suitable material and may for example be an organic resin such as an acrylic polymer, a copolymer of acrylic monomer and methacryloxysilane, or a copolymer of a methacrylic monomer and an acrylic monomer having a benzotriazole group or benzophenone group. These organic resins may be used alone or in combination of two or more.

The abrasion resistant layers are preferably formed from one or more materials selected from the group consisting of an organo-silicon, an acrylic, a urethane, a melamine or an amorphous $SiO_xC_yH_z$. Most preferably, the abrasion resistant layer is an organo-silicon layer, due to its superior abrasion resistance and compatibility with physical vapour deposited films. For example, an abrasion resistant layer comprising an organo-silicon polymer can be formed by forming a layer of a compound selected from the following compounds by a method such as dip coating or the like and then curing the layer:

trialkoxysilanes or triacyloxysilanes such as methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltracetoxysilane, vinyltrimethoxyethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltripropoxysilane, 3,3,3-trifluoropropyltrimethoxysilane gamma-glycidoxypropyltrimethoxysilane, gamma-glycidoxypropyltriethoxysilane, gamma-(beta-glycidoxyethoxy)propyltrimethoxysilane, beta-(3,4-epoxycyclohexyl)ethyltrimethoxysilane, beta-(3,4-epoxycyclohexyl)ethyltriethoxysilane, gamma-methacryloxypropyltrimethyoxysilane, gamma-aminopropyltrimethoxysilane, gamma-aminopropyltriethoxysilane, gamma-meraptopropyltrimethoxysilane, gamma-mercaptopropyltriethoxysilane, N-beta(aminoethyl)-gamma-aminopropyltrimethoxysilane, beta-cyanoethyltriethoxysilane and the like; as well as dialkoxysilanes or diacyloxysilanes such as dimethyldimethoxysilane, phenylmethyldimethoxysilane, dimethyldiethoxysilane, phenylmethyldiethoxysilane, gamma-glycidoxypropylmethyldimethoxysilane, gamma-glycidoxypropylmethyldiethoxysilane, gamma-glycidoxypropylphenyldimethoxysilane, gamma-glycidoxypropylphenyldiethoxysilane, gamma-chloropropylmethyldimethoxysilane, gamma-chloropropylmethyldiethoxysilane, dimethyldiacetoxysilane, gamma-methacryloxypropylmethyldimethoxysilane, gamma-metacryloxypropylmethyldiethoxysilane, gamma-mercaptopropylmethyldimethoxysilane, gamma-mercaptopropylmethyldiethoxysilane, gamma-aminopropylmethyldimethoxysilane, gamma-aminopropylmethyldiethoxysilane, methylvinyldimethoxysilane, methylvinyldiethoxysilane and the like.

The abrasion resistant layers may be coated onto the plastic substrate by dip coating in liquid followed by solvent evaporation, or by plasma enhanced chemical vapour deposition (PECVD) via a suitable monomer. Alternative deposition techniques such as flow coating and spray coating are also suitable. To improve the abrasion resistance of the hardcoating, subsequent coatings of the abrasion resistant layer may be added, preferably within a 48 hour period to as to avoid aging and contamination of the earlier coatings.

The thickness of the abrasion resistant layer is preferably selected to assist in providing adequate abrasion resistance. In this respect, adequate abrasion resistance is regarded herein as being a Bayer abrasion ratio of 5 with respect to an uncoated plastic substrate (such as a polycarbonate), or alternatively by a Taber abrasion test with delta haze less than 15% after testing with a 500 g load and CS10F wheel at 500 cycles, (% haze being measured as per ASTM D1003. With these requirements met, when an organo-silicon is used for the abrasion resistant layer(s), the thickness of the hardcoating is preferably in the range of from about 3 to about 15 microns, and is most preferably between 5 and 7 microns.

The intermediate zone of the plastic mirror of the present invention includes at least one layer that is formed from a metal, a metalloid, an oxide or nitride of a metal, an oxide or nitride of a metalloid, or carbon (such as a diamond-like carbon (DLC)). While metalloids are generally considered to be B, Si, Ge, As, Sb, Te and Po, the metal or metalloid for the at least one layer of the intermediate zone is preferably selected from the group consisting of Nb, Zr, Sn, Ta, Al, Cr, Ti, B and Si Most preferably, at least one layer is formed from a metalloid oxide, and the preferred metalloid oxide is $SiO_2$. Indeed, in the most preferred form, the intermediate zone will be provided by a single layer of $SiO_2$. In this respect, it will be appreciated that while it may be preferable for the intermediate zone to include only a single layer, it is envisaged that multiple layers could be provided to form the intermediate zone, preferably with each of the layers being formed from a metal, a metalloid, an oxide or nitride of a metal, an oxide or nitride of a metalloid, or carbon (such as a diamond-like carbon (DLC)).

The choice of the correct thickness for the intermediate zone also enhances the abrasion resistance of the mirror whilst maintaining optimum adhesion. If the intermediate zone is too thin, the coating suffers poor abrasion—if it is too thick, the adhesion is reduced. Again, the stress in the intermediate zone determines the performance in these tests, and a thick intermediate layer has increased compressive stress, which can be unfavourable. Preferably, the intermediate zone has a thickness in the range of from about 100 nm to about 200 nm, more preferably in the range of from about 120 nm to about 160 nm, and most preferably has a thickness of about 140 nm.

Preferred deposition methods that could be adopted for applying the intermediate zone to the hardcoating can be chosen from any vacuum vapour deposition system, such as thermal evaporation, electron beam evaporation (with or without ion beam assistance) or sputter deposition. Sputter deposition is the preferred method. Additionally, the surface of the hardcoating may first be subjected to a surface treatment to improve adhesion between the intermediate zone and the hardcoating. The surface treatment may be selected from any of plasma discharge, corona discharge, glow discharge, and UV radiation.

A layer that is said to be a "reflective" layer is a layer that provides a surface which is substantially reflective (% R>50%). The reflective layer of the plastic mirror of the present invention is preferably formed from a material selected from the group including: chromium, aluminium, titanium, nickel, molybdenum, zirconium, tungsten, silicon, niobium, tantalum, vanadium, cobalt, manganese, silver, zinc, and mixtures thereof; and an oxide, nitride, boride or carbide thereof, and mixtures thereof. Most preferably, the reflective layer is chromium, or a chromium mixture, such as Cr—Ni or Cr—Mo, or carbides or nitrides thereof. Preferably, the reflective layer has a thickness that is in the range of from about 20 nm to about 80 nm thick, more preferably in the range of from about 35 nm to about 50 nm, and most preferably has a thickness of about 40 nm.

The reflective layer preferably also blocks or reduces UV radiation from entering the hardcoating and subsequently the plastic substrate, which is advantageous as reduced radiation exposure generally extends the life of a product. Moreover, this reduction allows the use of highly abrasion resistant materials in the hardcoating, which would not normally be available in this type of application. In this respect, while it is recognised that UV resistance is usually achieved by the addition of UV absorbers into a hardcoating, it is also known that these normally have the effect of reducing the abrasion resistance through their function as plasticisers. Hardcoatings with no or limited UV absorbers, as in the present invention, thus have higher abrasion resistance than would be expected and tend to be more compatible with sputtered layers.

In a preferred form of the plastic mirror of the present invention, a cap layer may be provided on the reflective layer to further enhance the abrasion resistance and, by thickness variation, to provide an ability to impart colours to the mirror if desired (such as a blue color that is sometimes regarded as desirable in mirrors for automotive applications). The cap layer is preferably formed from a material selected from the group including silicon, titanium, aluminium, chromium, or an oxide or nitride thereof, or mixtures thereof—chromium nitride (CrN) is particularly preferred.

Indeed, chromium nitride with an increased level of nitrogen incorporated into the chromium has been found to be particularly advantageous. In one form, when the material used for the reflective layer is itself chromium nitride (such as $CrN_{0.2}$), it has been found to be beneficial to increase the amount of nitrogen in the cap layer above the nitrogen levels in the reflective layer (such as to $CrN_{0.4}$).

Preferably, the cap layer has a thickness that is in the range of from about 5 nm to about 40 nm thick, more preferably has a thickness in the range of from about 5 nm to about 25 nm, and most preferably has a thickness of about 5 nm.

Before turning to a description of various preferred embodiments of the present invention, it should also be appreciated that the present invention also provides a method of manufacturing a plastic mirror, the method including the steps of:
a) forming a plastic substrate having a front surface;
b) coating one or more abrasion resistant layers onto the front surface of the plastic substrate to form a hardcoating;
c) forming an intermediate zone on the hardcoating, including coating at least one layer thereon of a material selected from the group consisting of metals and metalloids, oxides and nitrides of metals and metalloids, and carbon; and
d) coating a reflective layer onto the intermediate zone, to form the plastic mirror.

BRIEF DESCRIPTION OF THE FIGURES

The present invention will now be described in relation to various preferred embodiments of which some aspects are illustrated in the accompanying figures, with other aspects being illustrated by the following examples. In the figures.

DETAILED DESCRIPTION OF THE PREFERRED EMBODIMENTS

Figure 1:
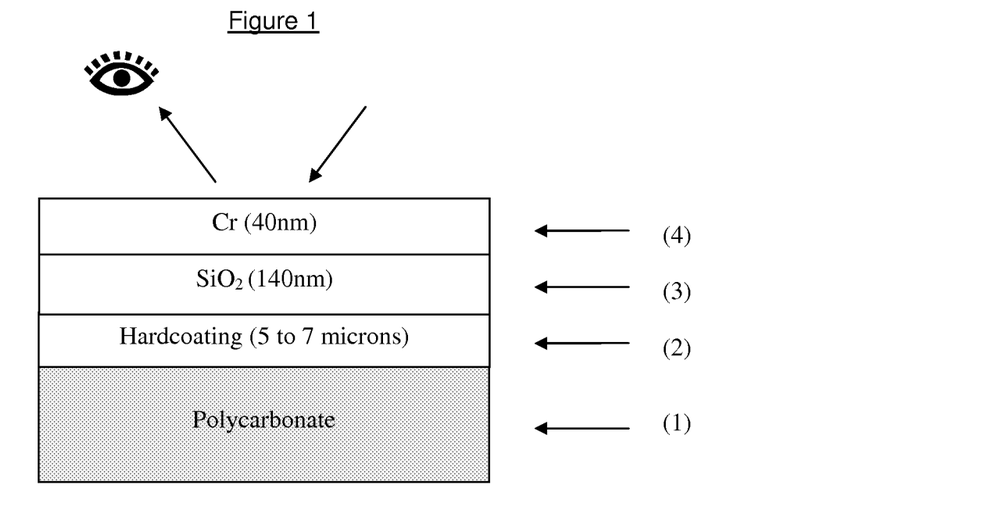
FIG. 1 is a schematic cross section of one embodiment of a plastic mirror that is in accordance with the present invention.

FIG. 1 is a schematic cross section of one embodiment of a plastic mirror in accordance with the present invention. In this embodiment, the plastic substrate (1) is polycarbonate, onto which is coated a hardcoating (2) in the form of a single abrasion resistant layer about 5 to about 7 microns in thickness. An intermediate zone in the form of a single layer (3) of $SiO_2$ is coated onto the hardcoat (2) in a thickness of about 140 nm. Coated onto the single layer (3) of $SiO_2$ is a reflective layer (4) of chromium, about 40 nm thick.

Figure 2:
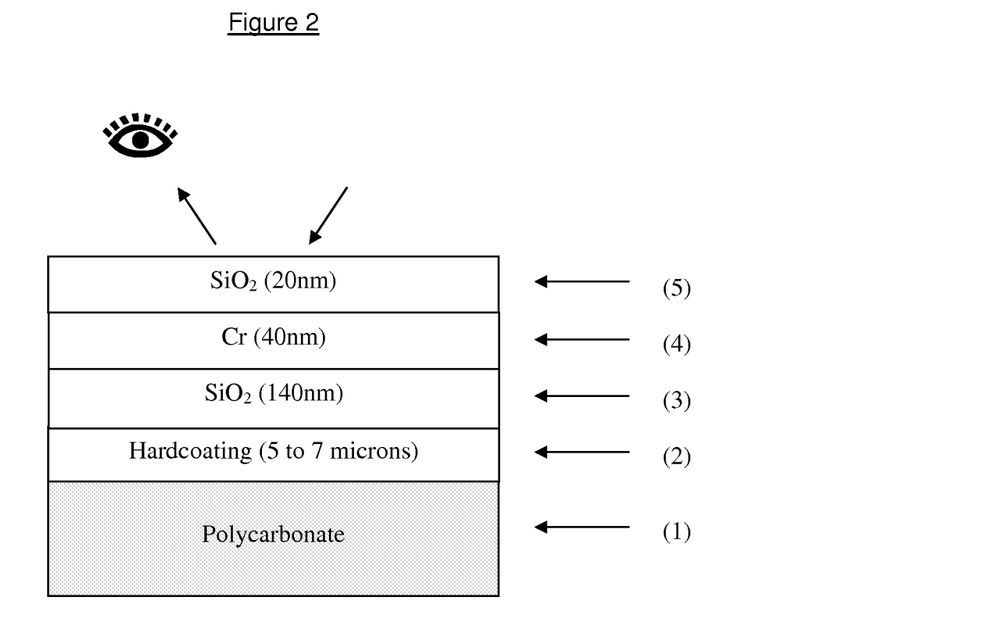
FIG. 2 is a schematic cross section of another embodiment of a plastic mirror that is in accordance with the present invention.

FIG. 2 is a schematic cross section of another embodiment of a plastic mirror in accordance with the present invention. In this embodiment, the layers (1), (2), (3), and (4) are the same as in the embodiment of FIG. 1. However, the embodiment of FIG. 2 further comprises a cap layer (5) of $SiO_2$, of about 20 nm in thickness.

The following examples illustrate some preferred embodiments of the invention. However, it should be understood that the following examples are illustrative only and should not be taken as a restriction on the generality of the invention as described above.

EXAMPLE 1

An injection moulded polycarbonate substrate is first cleaned through a commercial ultrasonic cleaning system with detergent. A final rinse in distilled water is required in a clean (dust free) environment. The substrate is then dip coated in a Momentive PHC-587B at a withdrawal rate of 10 mm/s. A flash-off time of 10 minutes allows solvents to slowly evaporate and the part to be largely tack free. The substrate is then moved to a curing oven for 45 minutes at 130° C. Subsequent coatings are performed within a 48 hour period so as to avoid aging/contamination of the hardcoating.

Samples are transferred to a holding oven maintained at 60° C., which ensures the plastic remains dry and helps reduce pump down times when transferred to the vacuum chamber.

The substrate is loaded into a batch type vacuum chamber, which consists of a single coating chamber in which the samples are placed, evacuated and coated. Within this chamber the samples were heated via an infrared heater to approximately 75° C. and evacuated to a pressure below $5\times10^{-5}$ mbar. The following were the deposition conditions:

Intermediate Zone (Single Layer):
Silicon Target
Argon @ 32 sccm
Oxygen @ 16 sccm
Pressure=2.3e-3 mbar
Power @ 2.4 kW
Target to substrate distance=110 mm
Deposition time=9 mins
Thickness=130 nm
Reflective Layer:
Chromium Target
Argon @ 120 sccm
Nitrogen @ 11 sccm
Pressure=4e-3 mbar
Power=1 kW
Target to substrate distance=110 mm
Time=2 minutes
Thickness=40 nm The measured residual stress of the layers was determined and the durability performance was tested. The results are set out in Tables 1 and 2, respectively.

TABLE 1

Measured stress of coating

| Layer | Measured Residual Stress |
| --- | --- |
| Abrasion resistant layer | n/a |
| Intermediate zone and reflective layer | −366 MPa |

TABLE 2

Durability Performance

| | Test Duration | Result |
| --- | --- | --- |
| Abrasion resistance (Steelwool) | 75 strokes | Abrasion ratio = 14 |
| Salt spray | 288 hrs | Pass |
| Thermal Shock | 200 cycles | Pass |
| Accelerated UV weathering (SAE J1960) | 2500 kJ/m² | Pass |
| Refection (% R) | | 55% |
| C* | | 6 |

EXAMPLE 2

An injection moulded polycarbonate substrate is first cleaned through a commercial ultrasonic cleaning system with detergent. A final rinse in distilled water is required in a clean (dust free) environment. The substrate is then dip coated in a SDC TSR 2626B at a withdrawal rate of 10 mm/s. A flash-off time of 10 minutes allows solvents to slowly evaporate and the part to be largely tack free. The substrate is then moved to a curing oven for 90 minutes at 130° C. Subsequent coatings are performed within a 48 hour period so as to avoid aging/contamination of the hardcoating.

Samples are transferred to a holding oven maintained at 60° C., which ensures the plastic remains dry and helps reduce pump down times when transferred to the vacuum chamber.

The substrate was loaded into an in-line type vacuum chamber, which consists of a multiple coating chambers. The samples were loaded into an airlock within which the samples were heated via an infrared heater to approximately 60° C. and evacuated to a pressure below $5\times10^{-5}$ mbar. The following were the deposition conditions:

Intermediate Zone (Single Layer):
Silicon Target
Argon @ 30 sccm
Oxygen @ 15 sccm
Pressure=2.3e-3 mbar
Power @ 2.0 kW
Target to substrate distance=100 mm
Deposition speed=4 mm/s
Thickness=130 nm
Reflective Layer:
Chromium Target
Argon @ 30 sccm
Nitrogen @ 2 sccm
Pressure=4e-3 mbar
Power=1 kW
Target to substrate distance=100 mm
Time=8 mm/s
Thickness=40 nm The measured residual stress of layers was determined and the durability performance was tested. The results are set out in Tables 3 and 4, respectively.

TABLE 3

Measured stress of coating

| Layer | Measured Residual Stress |
| --- | --- |
| Abrasion resistant layer | n/a |
| Intermediate zone and reflective layer | −389 MPa |

TABLE 4

Durability Performance

| | Test Duration | Result |
| --- | --- | --- |
| Abrasion resistance (Steelwool) | 75 strokes | Abrasion ratio = 14 |
| Salt spray | 288 hrs | Pass |
| Thermal Shock | 200 cycles | Pass |
| Accelerated UV weathering (SAE J1960) | 2500 kJ/m² | Pass |
| Refection (% R) | | 55% |
| C* | | 6 |

EXAMPLE 3

Another plastic mirror in accordance with the present invention, including a cap layer in the form of $SiO_2$, was manufactured using a batch type vacuum chamber. It was found that further improvement to the abrasion resistance of the mirror can be obtained by depositing a cap layer in the form of $SiO_2$.

The deposition conditions in this example were:
Intermediate Zone (Single Layer):
Silicon Target
Argon @ 32 sccm
Oxygen @ 16 sccm
Pressure=2.3e-3 mbar
Power @ 2.4 kW
Target to substrate distance=110 mm Deposition speed=9 minutes
Thickness=130 nm
Reflective Layer:
Chromium Target
Argon @ 120 sccm
Nitrogen @ 11 sccm
Pressure=4e-3 mbar
Power=1 kW
Target to substrate distance=110 mm
Time=2 minutes
Thickness=40 nm
Cap Layer:
Silicon Target
Argon @ 120 sccm
Oxygen @ 40 sccm
Pressure=2.3e-3 mbar
Power @ 2 kW
Target to substrate distance=110 mm
Deposition time=90 seconds
Thickness=10 nm The measured residual stress of the layers was determined and the durability performance was tested. The results are set out in Tables 5 and 6, respectively.

TABLE 5

Measured stress of coating

| Layer | Measured Residual Stress |
|---|---|
| Intermediate zone, reflective layer and cap layer | −400 MPa |

TABLE 6

Durability Performance

| | Test Duration | Result |
|---|---|---|
| Abrasion resistance (Steelwool) | 75 strokes | Abrasion ratio = 22 |
| Scuff Test | 10 strokes with 100 gram load | Pass (no visible damage) |
| Salt spray | 288 hrs | Pass |
| Thermal Shock | 200 cycles | Pass |

EXAMPLE 4

Another plastic mirror in accordance with the present invention, this time including a cap layer in the form of CrN, was manufactured using a batch type vacuum chamber. It was found that further improvement to the abrasion resistance of the mirror can be obtained by depositing a cap layer in the form of CrN. In this example, the deposition conditions were:
Intermediate Zone (Single Layer):
Silicon Target
Argon @ 32 sccm
Oxygen @ 16 sccm
Pressure=2.3e-3 mbar
Power @ 2.4 kW
Target to substrate distance=110 mm
Deposition speed=9 minutes
Thickness=130 nm
Reflective Layer:
Chromium Target
Argon @ 130 sccm
Nitrogen @ 11 sccm
Pressure=4e-3 mbar
Power=1 kW
Target to substrate distance=110 mm
Time=2 minutes
Thickness=40 nm
Cap Layer:
Chromium Target
Argon @ 130 sccm
Nitrogen @ 40 sccm
Pressure=4e-3 mbar
Power @ 1 kW
Target to substrate distance=110 mm
Time=45 seconds
Thickness=10 nm The measured residual stress of the layers was determined and the durability performance was tested. The results are set out in Tables 7 and 8, respectively.

TABLE 7

Measured stress of coating

| Layer | Measured Residual Stress |
|---|---|
| Intermediate zone, reflective layer and cap layer | −360 MPa |

TABLE 8

Durability Performance

| | Test Duration | Result |
|---|---|---|
| Abrasion resistance (Steelwool) | 75 strokes | Visual rating = 4 out of 5 (where 5 is no visible damage) |
| Skuff Test | 5 strokes | Pass (no visible damage) |

EXAMPLE 5

A plastic mirror in accordance with the present invention was manufactured in which the abrasion resistant layer of the hardcoating was formed under vacuum in an in-line type vacuum chamber using a microwave plasma enhanced chemical vapour deposition (PECVD). The coating can be described as an amorphous $SiO_xC_yH_z$. It was found that further improvement to the process can be made by replacing the liquid hardcoating to one that is formed under vacuum using a microwave plasma enhanced chemical vapour deposition (PECVD). In this example, the deposition conditions were:
Abrasion Resistant Layer (Hardcoating):
Plasma pre-treatment conditions
Power=2 kW
Pressure=2e-1 mbar
Monomer=none
Reactant gas=propanol @ 100 sccm
Time=120 seconds
Deposition Conditions
Plasma pre-treatment
Power=2 kW
Pressure=5e-1 mbar
Monomer=Tetramethyldisiloxane @ 133 sccm
Reactant gas=oxygen graded from 200 to 400 sccm
Time=70 seconds
Thickness=4 microns
Intermediate Zone (Single Layer):
Silicon Target
Argon @ 30 sccm Oxygen @ 15 sccm
Pressure=2.3e-3 mbar
Power @ 2 kW
Target to substrate distance=100 mm
Deposition speed=4 mm/s
Thickness=130 nm
Reflective Layer:
Chromium Target
Argon @ 32 sccm
Nitrogen @ 2 sccm
Pressure=4e-3 mbar
Power=1 kW
Target to substrate distance=100 mm
Time=8 mm/s
Thickness=40 nm The measured residual stress of the layers was determined and the durability performance was tested. The results are set out in Tables 9 and 10, respectively.

TABLE 9

Measured stress of coating

| Layer | Measured Residual Stress |
|---|---|
| Abrasion resistant coating | n/a |
| Intermediate zone and reflective layer | −340 MPa |

TABLE 10

Durability Performance

| | Test duration | Result |
|---|---|---|
| Abrasion resistance (Steelwool) | 75 strokes | Abrasion ratio = 15 |
| Skuff Test | 5 strokes | Pass (no visible damage) |
| Salt spray | 288 hrs | Not tested |
| Thermal Shock | 200 cycles | Not tested |

EXAMPLE 6

Another plastic mirror in accordance with the present invention, this time including an intermediate layer in the form of Al2O3, was manufactured in a batch type vacuum chamber.

In this example, the deposition conditions were:
Intermediate Zone (Single Layer):
Aluminium Target
Argon @ 32 sccm
Oxygen @ 16 sccm
Pressure=2.3e-3 mbar
Power @ 2.4 kW
Target to substrate distance=110 mm
Deposition speed=9 minutes
Thickness=130 nm
Reflective Layer:
Chromium Target
Argon @ 130 sccm
Nitrogen @ 11 sccm
Pressure=4e-3 mbar
Power=1 kW
Target to substrate distance=110 mm
Time=2 minutes
Thickness=40 nm
Cap Layer:
Chromium Target
Argon @ 130 sccm
Nitrogen @ 40 sccm
Pressure=4e-3 mbar
Power @ 1 kW
Target to substrate distance=110 mm
Time=45 seconds
Thickness=10 nm The measured residual stress of the layers was determined and the durability performance was tested. The results are set out in Tables 11 and 12, respectively.

TABLE 11

Measured stress of coating

| Layer | Measured Residual Stress |
|---|---|
| Intermediate layer, reflective layer and cap layer | −360 MPa |

TABLE 12

Durability Performance

| | Test Duration | Result |
|---|---|---|
| Abrasion resistance (Steelwool) | 75 strokes | Visual rating = 4 out of 5 (where 5 is no visible damage) |
| Skuff Test | 5 strokes | Pass (no visible damage) |

EXAMPLE 7

Another plastic mirror in accordance with the present invention was manufactured in a split process that moves the sample from one deposition chamber (an in-line type-_vacuum chamber) to another (a batch type vacuum chamber) after the intermediate zone has been deposited but before the reflective layer was deposited. It was found that the stress required for good performance was altered. The deposition conditions in this example were:
Intermediate Zone (Single Layer):
Silicon Target
Argon @ 30 sccm
Oxygen @ 15 sccm
Pressure=2.3e-3 mbar
Power @ 2.0 kW
Target to substrate distance=100 mm
Deposition speed=4 mm/s
Thickness=130 nm
Reflective Layer:
Chromium Target
Argon @ 120 sccm
Nitrogen @ 11 sccm
Pressure=4e-3 mbar
Power=1 kW
Target to substrate distance=110 mm
Time=2 minutes
Thickness=40 nm
Cap Layer:
Silicon Target
Argon @ 120 sccm
Oxygen @ 40 sccm
Pressure=2.3e-3 mbar
Power @ 2 kW
Target to substrate distance=110 mm
Deposition time=90 seconds
Thickness=10 nm The stress of the individual layers was measured and the durability performance was tested. The results are set out in Tables 13 and 14, respectively.

TABLE 13

Measured stress of individual layers

| Layer | Stress |
|---|---|
| Abrasion resistant layer | n/a |
| Intermediate zone | −430 MPa |
| Reflective Layer | 400 |
| Differential stress | 830 |
| Calculated residual stress | −30 |

TABLE 14

Durability Performance

| | Test Duration | Result |
|---|---|---|
| Abrasion resistance (Steelwool) | 75 strokes | Abrasion ratio = 22 |
| Scuff Test | 10 strokes with 100 gram load | Pass (no visible damage) |
| Salt spray | 288 hrs | Pass |
| Thermal Shock | 200 cycles | Pass |

EXAMPLE 8

Another plastic mirror was manufactured using a batch type vacuum chamber, but omitting the intermediate zone. It was found that there was crazing of the reflective layer on venting to atmosphere and poor thermal shock performance.

The deposition conditions in this example were:
Reflective Layer:
Chromium Target
Argon @ 120 sccm
Nitrogen @ 11 sccm
Pressure=4e-3 mbar
Power=1 kW
Target to substrate distance=110 mm
Time=2 minutes
Thickness=40 nm The measured residual stress of the layers was determined and the durability performance was tested. The results are set out in Tables 15 and 16, respectively.

TABLE 15

Measured stress of individual layers

| Layer | Measured Residual Stress |
|---|---|
| Reflective Layer | +400 MPa |

TABLE 16

Durability Performance

| | Test Duration | Result |
|---|---|---|
| Abrasion resistance (Steelwool) | 75 strokes | Abrasion ratio = 1 |
| Scuff Test | 10 strokes with 100 gram load | Fail (coating removed) |

TABLE 16-continued

Durability Performance

| | Test Duration | Result |
|---|---|---|
| Salt spray | 288 hrs | Fail |
| Thermal Shock | 200 cycles | Fail (crazing) |

A person skilled in the art will understand that there may be variations and modifications other than those specifically described. It is to be understood that the invention includes all such variations and modifications. The invention also includes all steps, features, compositions and compounds referred to, or indicated in this specification, individually or collectively, and any and all combinations of any two or more of the steps or features.

The invention claimed is:

1. A plastic mirror comprising a plastic substrate having a front surface, a hardcoating on the front surface, a reflective layer having a reflectance of greater than 50%, and an intermediate zone between the hardcoating and the reflective layer, the intermediate zone including at least one layer formed from a material selected from the group consisting of metals and metalloids, oxides and nitrides of metals and metalloids, and carbon.

2. A plastic mirror according to claim 1, wherein the plastic substrate is formed from a material selected from the group consisting of: polyacrylate, polyester, polystyrene, polyethylene, polypropylene, polyamides, polyimides, polycarbonate, epoxy, phenolic, acrylonitrile-butadiene-styrenes, acetyl materials, poly (2,2'-dihydroxyphenylpropane) carbonate, polydiethyleneglycol bis(allyl carbonate), polymethylmethacrylate and polystyrene polycarbonate, and blends thereof.

3. A plastic mirror according to claim 1, wherein the hardcoating is formed from at least one abrasion resistant layer, the at least one abrasion resistant layer being formed from a material selected from the group consisting of an organo-silicon, an acrylic, a urethane, melamine and a $SiO_xC_yH_z$.

4. A plastic mirror according to claim 3, wherein the hardcoating has a thickness in the range of from about 3 microns to about 15 microns.

5. A plastic mirror according to claim 1, wherein the metal or metalloid is selected from the group consisting of Si, Nb, Zr, Sn, Ta, Al, Cr and Ti.

6. A plastic mirror according to claim 5, wherein the intermediate zone includes at least one layer formed from a material selected from the group consisting of $SiO_2$, Si, $Al_2O_2$ and $110_2$.

7. A plastic mirror according to claim 1, wherein the intermediate zone has a thickness in the range of from about 100 nm to about 200 nm.

8. A plastic mirror according to claim 1, wherein the reflective layer is a material selected from the group consisting of: chromium, aluminium, titanium, nickel, molybdenum, zirconium, tungsten, silicon, niobium, tantalum, vanadium, cobalt, manganese, silver, zinc, and mixtures thereof; and an oxide, nitride, boride or carbide thereof, and mixtures thereof.

9. A plastic mirror according to claim 8, wherein the reflective layer is formed from chromium, or a chromium mixture.

10. A plastic mirror according to claim 1, wherein the reflective layer has a thickness in the range of from about 20 nm to about 80 nm, or preferably in the range of from about 20 nm to about 80 nm.

11. A plastic mirror according to claim 1, further including a cap layer disposed on the reflective layer.

12. A plastic mirror according to claim 11, wherein the cap layer is formed from a material selected from the group consisting of silicon, titanium, aluminium, chromium, chromium nitride, an oxide or nitride thereof, and mixtures thereof.

13. A plastic mirror according to claim 12, wherein the cap layer has a thickness in the range of from about 5 nm to about 40 nm.

14. A plastic mirror according to claim 1, wherein the mirror has a residual stress that is compressive.

15. A plastic mirror according to claim 14, wherein the mirror has a measured residual stress between about −350 and about −600 MPa.

16. A plastic mirror according to claim 1, wherein the mirror has a differential stress between about 730 and about 930 MPa.

17. A plastic mirror according to claim 1 comprising an automotive mirror.

18. A method of manufacturing a plastic mirror, the method including the steps of:
forming a plastic substrate having a front surface;
coating one or more abrasion resistant layers onto the front surface of the plastic substrate to form a hardcoating;
forming an intermediate zone on the hardcoating, including coating at least one layer thereon of a material selected from the group consisting of metals and metalloids, oxides, and nitrides of metals and metalloids and carbon; and
coating a reflective layer having a reflectance of greater than 50% onto the intermediate zone to form the plastic mirror.

19. A method according to claim 18, wherein the plastic substrate is formed from a material selected from the group consisting of polyacrylate, polyester, polystyrene, polyethylene, polypropylene, polyamides, polyimides, polycarbonate, epoxy, phenolic, acrylonitrile-butadiene-styrenes, acetyl materials, poly (2,2'-dihydroxyphenylpropane) carbonate, polydiethyleneglycol bis(allyl carbonate), polymethylmethacrylate and polystyrene polycarbonate.

20. A method according to claim 18, wherein the hardcoating is formed from one or more abrasion resistant layers, the abrasion resistant layers being formed from a material selected from the group consisting of an organo-silicon, an acrylic, a urethane, melamine and a $SiO_xC_yH_z$.

21. A method according to claim 18, wherein the hardcoating has a thickness in the range of from about 3 microns to about 15 microns.

22. A method according to claim 18, wherein the metal or metalloid is selected from the group consisting of Si, Nb, Zr, Sn, Ta, Al, Cr and Ti.

23. A method according to claim 22, wherein the intermediate zone includes at least one layer formed from a material selected from the group consisting of $SiO_2$, Si, $Al_2O_3$ and $TiO_2$.

24. A method according to claim 18, wherein the intermediate zone has a thickness in the range of from about 100 nm to about 200 nm.

25. A method according to claim 18, wherein the reflective layer is a material selected from the group consisting of: chromium, aluminium, titanium, nickel, molybdenum, zirconium, tungsten, silicon, niobium, tantalum, vanadium, cobalt, manganese, silver, zinc, and mixtures thereof; and an oxide, nitride, boride or carbide thereof, and mixtures thereof.

26. A method according to claim 25, wherein the reflective layer is formed from chromium, or a chromium mixture.

27. A method according to claim 18, wherein the reflective layer has a thickness in the range of from about 20 nm to about 80 nm.

28. A method according to claim 18, further including a cap layer on the reflective layer.

29. A method according to claim 28, wherein the cap layer is formed from a material selected from the group consisting of silicon, titanium, aluminium, chromium, or an oxide or nitride thereof, and mixtures thereof.

30. A method according to claim 28, wherein the cap layer has a thickness in the range of from about 5 nm to about 40 nm.

31. A method according to claim 18, wherein the mirror has a residual stress that is compressive.

32. A method according to claim 31, wherein the mirror has a measured residual stress between about −350 MPa and about −600 MPa.

33. A method according to claim 31, wherein the mirror has a differential stress between about 730 MPa and about 930 MPa.

34. A method according to claim 18, wherein the plastic substrate is formed by a molding process selected from the group consisting of injection compression molding, compression molding, blowmolding, reaction molding and sheet casting injection molding.

35. A method according to claim 18, wherein the hardcoating is coated onto the plastic substrate by a process selected from the group consisting of dip coating in liquid followed by solvent evaporation, plasma enhanced chemical vapor deposition (PECVD), flow coating, and spray coating.

36. A method according to claim 18, wherein the intermediate zone, the reflective layer and any cap layer are formed by vacuum vapor deposition.

37. A method according to claim 18, wherein the intermediate zone, the reflective layer and any cap layer are formed by sputter deposition.

38. A method according to claim 37, wherein the stress level of the intermediate zone, the reflective layer and any cap layer is controlled by varying a parameter selected from the group consisting of sputter power, pressure, temperature, deposition rate, substrate bias and target to substrate distance.

39. A method according to claim 37, wherein the stress level of the reflective layer is reduced by adding about 5% nitrogen to feed gas during the sputter deposition.

40. A method according to claim 37, wherein the stress level of the intermediate zone is reduced by reducing sputter power during the sputter deposition.

41. A method according to claim 37, wherein the surface of the hardcoating is first subjected to a surface treatment to improve adhesion between the intermediate zone and the hardcoating.

42. A plastic mirror according to claim 7, wherein the intermediate zone has a thickness in the range of from about 120 nm to about 200 nm.

43. A plastic mirror according to claim 42, wherein the intermediate zone has a thickness of about 140 nm.

44. A plastic mirror according to claim 9 wherein the chromium mixture is selected from the group consisting of Cr—Ni, Cr—Mo, and carbides and mixtures thereof.

45. A plastic mirror according to claim 10, wherein the reflective layer has a thickness in the range of from about 20 nm to about 80 nm.

46. A plastic mirror according to claim 45, wherein the reflective layer has a thickness of about 40 nm.

47. A plastic mirror according to claim 13, wherein the cap layer has a thickness in the range of from about 5 nm to about 25 nm.

48. A plastic mirror according to claim 47, wherein the cap layer has a thickness of about 5 nm.

49. A plastic mirror according to claim 15, wherein the mirror has a measured residual stress of about −400 MPa.

50. A plastic mirror according to claim 16, wherein the mirror has a differential stress of about 830 Mpa.

51. A method according to claim 18, wherein the at least one layer comprises a material selected from the group consisting of metals, metal oxides and metal nitrides.

52. A method according to claim 24, wherein the intermediate zone has a thickness in the range of from about 120 nm to about 160 nm.

53. A method according to claim 52, wherein the intermediate zone has a thickness of about 140 nm.

54. A method according to claim 26, wherein the chromium mixture is selected from the group consisting of Cr—Ni, Cr—Mo, and carbides and nitrides thereof.

55. A method according to claim 27, wherein the reflective layer has a thickness in the range of from about 35 nm to about 50 nm.

56. A method according to claim 55, wherein the reflective layer has a thickness of about 40 nm.

57. A method according to claim 30, wherein the cap layer has a thickness in the range of from about 5 nm to about 25 nm.

58. A method according to claim 57, wherein the cap layer has a thickness of about 5 nm.

59. A method according to claim 32, wherein the mirror has a measured residual stress of about −400 MPa.

60. A method according to claim 33 wherein the mirror has a differential stress of about 830 MPa.

61. A method according to claim 36, wherein said vacuum vapor deposition comprises a process selected from the group consisting of thermal evaporation, electron beam deposition, electron beam evaporation with ion beam assistance, and sputter deposition.

\* \* \* \* \*